United States Patent Office 3,714,117
Patented Jan. 30, 1973

3,714,117
**THERMALLY STABILIZED FLUOROKETONE/
VINYL FLUORIDE COPOLYMERS**
Edward George Howard, Jr., Hockessin, Del., assignor to
E. I. du Pont de Nemours and Company, Wilmington,
Del.
No Drawing. Filed Dec. 29, 1970, Ser. No. 102,522
Int. Cl. C08f 45/56, 45/58, 45/60
U.S. Cl. 260—45.9 R                      12 Claims

ABSTRACT OF THE DISCLOSURE

Copolymers of vinyl fluoride and fluoroketones can be stabilized against thermal degradation by treating them with a basic organo nitrogen or phosphorus compound having a $pK_a \geqslant 2.5$.

BACKGROUND OF THE INVENTION

(1) Field of the invention

This invention relates to thermoplastic compositions and more particularly to thermally stabilized vinyl fluoride/fluoroketone copolymers.

(2) The prior art

Copolymers of vinyl fluoride with polyfluoroketones are taught in U.S. Pat. 3,342,777. These copolymers are more stable thermally than vinyl fluoride homopolymers. However, many of them are characterized by darkening on heating and particularly by gradual loss of their initially good thermoplastic flow properties on prolonged heating. This makes them difficult to fabricate by melt-flow techniques such as by melt-extrusion because the flow properties change with time of heating. The copolymers may even become non-flowing under the pressures available in standard melt-extrusion equipment.

(3) Summary of the invention

The compositions of this invention are copolymers of vinyl fluoride with a polyfluoroketone of the formula

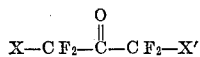

in which X and X' may be the same or different and can be hydrogen, halogen, perfluoroalkyl, ω-hydro-, ω-chloro-, ω-bromo- and ω-alkoxyperfluoroalkyl group of up to 18 carbon atoms; or taken together may be haloperfluoroalkylene of 1 to 3 carbon atoms, in which halogen is a halogen of atomic number 9 to 35, and a stabilizing amount of a basic organic nitrogen or phosphorus-containing compound characterized by a $pK_a \geqslant 2.5$.

DETAILED DESCRIPTION OF THE INVENTION

The copolymers to be stabilized according to this invention are shown in U.S. Pat. 3,342,777. They are the copolymers of vinyl fluoride with polyfluoroketones of the formula

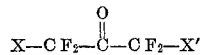

in which X and X', which may be the same or different, are selected from the group consisting, individually, of hydrogen, halogen of atomic number 9–35, perfluoroalkyl, and ω-hydro-, ω-chloro-, ω-bromo-, and ω-alkoxyperfluoroalkyl, all of such alkyl groups being of up to 18 carbons, and jointly, of haloperfluoroalkylene of 1–3 carbons (all halogen being of atomic number 9–35).

The mole ratio of polyfluoroketone to vinyl fluoride in the copolymers may vary from 1:1 to 1:1000. The preferred copolymers are those of hexafluoroacetone with vinyl fluoride.

The stabilizers of the present invention are organic nitrogen or phosphorus bases characterized by a $pK_a \geqslant 2.5$ [Arnett et al., J. Am. Chem. Soc. 92 1260–6 (1970)] and include ammonia, N,N-dimethyldodecylamine, tetraethylenepentamine, triphenylphosphine and potassium phenylphosphinate.

A stabilizing amount of the stabilizing compound should be employed, which may be varied from 0.1% to 10% of the weight of the copolymer being stabilized and preferably is in the range from 0.2% to 3%.

The stabilizing compound is incorporated into the copolymer by known means. For example, it may be incorporated during polymerization of the copolymer or it may be added to the finished copolymer by dry-grinding, by soaking in a solvent for the stabilizer, by coating the stabilizer onto the finely divided copolymer from solution as in ether, by hot melt mixing, by direct absorption of the stabilizer into the copolymer and the like.

The melt-flow properties of the stabilized and unstabilized copolymers are readily observed and compared by testing the compositions in an extrusion plastometer or melt-flow indexer, according to ASTM Test D–1238–65–T. In this test the composition is heated at a controlled temperature under the dead weight pressure of a piston. The amount of the composition extruding from a standard orifice during selected periods of time is collected and weighed. In all of the tests shown in this specification, a weight of 2050 g. and an orifice of 0.12 inch diameter were used. Melt-flow rates were calculated from the amounts extruded at various times during the heating period.

The mode of action of the basic additives in stabilizing fluoroketone/vinyl fluoride copolymers is not fully understood, however, the following is offered as a mechanism for the established stabilizing action, it being understood that the explanation is in no way limiting or exclusive of other modes of action.

It is believed that the fluoroketone monomer introduces side chains into the copolymer having hydroxy groups wherein the hydroxylic hydrogen is substantially more acidic than the hydroxylic hydrogen of alkanols. The basic additives are believed to react with the hydroxylic groups of the polymers to form salts. The initial degradation of vinyl fluoride-derived units in the polymer is believed to yield hydrogen fluoride, a product which further reacts with the polymers to extend the degradation. The salt structures react reversibly with the hydrogen fluoride to form ionic fluoride salts and to regenerate the original hydroxyl function. For example, in the case where ammonia is employed as the basic additive, the above sequence of reactions can be represented:

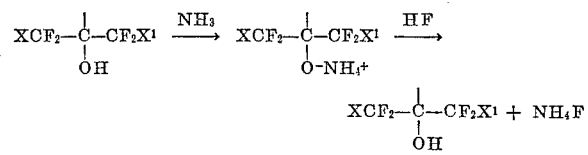

SPECIFIC EMBODIMENTS OF THE INVENTION

In the examples which follow, parts and percentages are by weight unless otherwise indicated. Preparations of hexafluoroacetone/vinyl fluoride copolymers for use in this invention are shown in Examples A to E which precede the numbered examples. These examples are provided by way of illustration and should not be construed as fully delineating the scope of this invention.

Example A

A Hastelloy pressure reactor (200 ml.) was charged with 0.3 g. of 70% t-butylperoxy pivalate in mineral spirits, 32 g. of methanol and 0.1 ml. of t-butylmercaptan. The reactor was cooled, evacuated and charged with 83 g. of hexafluoroacetone and 63 g. of vinyl fluoride. The sealed reactor was heated at 45° C. for 2 hours, 50° C. for 3 hours and 55° C. for 2 hours. During this latter period the polymerization became exothermic and carried the temperature to 65° C. and the pressure to 480 p.s.i. for a few minutes. The reactor was cooled and opened and the product was boiled in water, washed with methanol and dried at 120° C. under vacuum. There was obtained 28 g. of hexafluoroacetone/vinyl fluoride copolymer in the form of a white solid. Inherent viscosity at 0.5 concentration in dimethylformamide at 125° C. was 0.56. Melt flow was observed at 235° C. in the melt indexer according to ASTM Test D-1238-65-T. The flow rate after four minutes was 6.4 g./10 minutes and at 30 minutes was 3.9 g./10 minutes.

Example B

Using the procedure of Example A, a reactor was charged with 0.3 g. of 70% t-butylperoxy pivalate in mineral spirits, 32 g. of methanol, 0.2 ml. of dodecylmercaptan, 83 g. of hexafluoroacetone and 63 g. of vinyl fluoride. Polymerization and product recovery were carried out as in Example A. There resulted 36 g. of a hexafluoroacetone/vinyl fluoride copolymer. Melt flow was observed at 235° C. as in Example A. The rate was 13 g./10 minutes after four minutes. At 30 minutes the copolymer had ceased to flow.

Example C

An autoclave was charged with 300 g. of 1,1,2-trichlorotrifluoroethane, 5 ml. of a 10% solution of bis(pentafluoropropionyl)peroxide in 1,1,2-trichlorotrifluoroethane, 2 g. of hexafluoroacetone and 135 g. of vinyl fluoride. In a second pressure vessel was prepared a solution of 2 g. of hexafluoroacetone in 400 ml. of 1,1,2-trichlorotrifluoroethane. The autoclave was stirred and heated at 35° C. and at 10-minute intervals 45 g. portions of the solution were pressured from the second pressure vessel into the autoclave until all of the solution was added. Ten minutes after the final addition the autoclave was cooled and vented. The hexafluoroacetone/vinyl fluoride copolymer was recovered by filtration and dried. It weighed 45 g. Melt flow was observed at 235° C. as in Example A. Initial melt flow was at a rate of 5.3 g./10 minutes (grey-black extrudate). After 30 minutes the polymer did not flow.

Example D

The procedure of Example C was repeated except that 1 g. portions of hexafluoroacetone were added to the autoclave and to the second pressure vessel instead of 2 g. portions. The polymer weighed 55 g. Melt flow was observed at 235° C. as in Example A. Initial melt flow was at a rate of 11.8 g./10 minutes (grey-black extrudate). After 30 minutes the polymer did not flow.

Example E

The procedure of Example D was repeated. The polymer weighed 45 g. Melt flow was observed at 235° C. as in Example A. Initial melt flow was at a rate of 17 g./10 minutes (brown extrudate). After 20 minutes the polymer did not flow.

Example 1

Polymer from Example B in powder form was coated with 1% by weight of triphenylphosphine by dissolving the triphenylphosphine in diethyl ether, mixing the ether solution thoroughly with the powdered polymer and then allowing the ether to evaporate. Melt flow was then observed at 235° C. as in Example A. The rate was 12.8 g./10 minutes after 30 minutes and the color of the extrudate at this point was lighter than the control at four minutes.

Example 2

Polymer from Example B in powder form was coated with 1% by weight of N,N-dimethyldodecylamine from ether solution using the procedure of Example 1. Melt flow was then observed at 235° C. as in Example A. The rate was 16.4 g./10 minutes after 4 minutes and 11.6 g./10 minutes after 30 minutes.

Example 3

Polymer from Example C in powder form was stored overnight in an atmosphere of pure ammonia gas. On removal of the polymer from the ammonia atmosphere the stabilized polymer was tested for melt flow at 235° C. as in Example A. Initial flow was at a rate of 7.8 g./10 minutes (yellow extrudate). After 30 minutes the rate was 6.8 g./10 minutes (yellow-brown extrudate).

Example 4

Polymer from Example D in powder form was stored overnight in an atmosphere of pure ammonia gas. On removal of the polymer from the ammonia atmosphere the stabilized polymer was tested for melt flow at 235° C. as in Example A. Initial flow was at a rate of 8.2 g./10 minutes (yellow extrudate). After 30 minutes the rate was 6.6 g./10 minutes (yellow-brown extrudate).

Example 5

Polymer from Example E in powder form was stored overnight in an atmosphere of pure ammonia gas. On removal of the polymer from the ammonia atmosphere the stabilized polymer was tested for melt flow at 235° C. as in example A. Initial flow was at a rate of 12.6 g./10 minutes (pale yellow extrudate). After 30 minutes the rate was 9 g./10 minutes (yellow extrudate).

Example 6

A hexafluoroacetone/vinyl fluoride copolymer similar to those prepared in Examples A and B was stored in powder form for two days in an atmosphere of pure ammonia gas. The polymer was then pelleted and the pellets stored another day in ammonia. The ammonia atmosphere was maintained during charging the pellets into the melt indexer. The stabilized polymer was then tested for melt flow at 235° C. as in Example A. After four minutes the flow was at a rate of 0.75 g./10 minutes. After 15 minutes and also after 30 minutes, the rate was 0.60 g./10 minutes. After 60 minutes the rate was 0.65 g./10 minutes.

Example 7

A hexafluoroacetone/vinyl fluoride copolymer similar to those prepared in Examples A and B was coated in powder form with 1% by weight of potassium phenylphosphinate from methanol solution using the procedure of Example 1. The stabilized polymer was tested for melt flow at 235° C. as in Example A. After four minutes the rate was 3.5 g./10 minutes. After 15 minutes and also after 30 minutes, the rate was 3.0 g./10 minutes.

Example 8

The procedure of Example 7 was repeated except that 1% of tetraethylenepentamine was used in place of potassium phenylphosphinate and applied from ether solution. After four minutes the rate was 3.2 g./10 minutes. After 15 minutes the rate was 2.3 g./10 minutes. After 30 minutes the rate was 1.7 g./10 minutes.

When the following polyfluoroketones are substituted for hexafluoroacetone in the polymerization procedures of Examples 8 and 41 of U.S. 3,342,777 or Examples A to E above, vinyl fluoride copolymers are obtained which are stabilized according to this invention by incorporating the stabilizers shown in the procedures of all the foregoing numbered examples:

1H,3H-tetrafluoropropane-2-one,
1-chloropentafluoropropanone,
Perfluoropentane-2-one,
9-bromoperfluorononane-4-one,
Perfluorododecane-5-one,
1H,7H-dodecafluoroheptane-3-one,
1,5-dichloroperfluoropentane-3-one,
1,9-dibromoperfluorononane-5-one,
1,17-dichloroperfluoroheptadecane-9-one,
Perfluorocyclobutanone,
3-chloro-2,2,3,4,4-pentafluorocyclobutanone,
3-bromo-2,2,3,4,4-pentafluorocyclobutanone,
4-methoxyperfluorobutane-2-one,
5-octyloxyperfluoropentane-3-one, and the like, and the hydrated forms thereof.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A composition comprising
   (a) a copolymer of vinyl fluoride and a polyfluoroketone having the formula

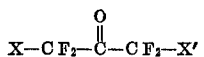

wherein X and X' are the same or different and are hydrogen, halogen, perfluoroalkyl, ω-hydroperfluoroalkyl, ω-chloroperfluoroalkyl, ω-bromoperfluoroalkyl, or ω-alkoxyperfluoroalkyl groups, said groups being up to 18 carbon atoms, or taken together, X and X' are haloperfluoroalkylene of 1 to 3 carbon atoms, the halogen atoms of said X and X' groups having an atomic number of from 9 to 35; and,
   (b) a stabilizing amount of a thermal stabilizer selected from triphenylphosphine, potassium phenyl phosphinate, ammonia, N,N-dimethyldodecylamine, and tetraethylenepentamine.

2. Composition of claim 1 in which said thermal stabilizer is triphenylphosphine.

3. Composition of claim 1 in which said thermal stabilizer is potassium phenylphosphinate.

4. Composition of claim 1 in which said thermal stabilizer is ammonia.

5. Composition of claim 1 in which said thermal stabilizer is N,N-dimethyldodecylamine.

6. Composition of claim 1 in which said thermal stabilizer is tetraethylenepentamine.

7. Composition of claim 1 in which said polyfluoroketone is hexafluoroacetone.

8. Composition of claim 2 in which said polyfluoroketone is hexafluoroacetone.

9. Composition of claim 3 in which said polyfluoroketone is hexafluoroacetone.

10. Composition of claim 4 in which said polyfluoroketone is hexafluoroacetone.

11. Composition of claim 5 in which said polyfluoroketone is hexafluoroacetone.

12. Composition of claim 6 in which said polyfluoroketone is hexafluoroacetone.

References Cited

UNITED STATES PATENTS

| | | | |
|---|---|---|---|
| 2,981,715 | 4/1961 | Ben | 260—45.7 |
| 3,485,792 | 12/1969 | Howard, Jr. | 260—45.7 |
| 3,496,137 | 2/1970 | Stewart et al. | 260—45.9 |
| 3,505,285 | 4/1970 | Hermann et al. | 260—45.75 |
| 3,522,205 | 7/1970 | Gobran et al. | 260—45.9 |
| 3,533,981 | 10/1970 | Franks et al. | 260—31.8 |
| 3,534,124 | 10/1970 | Howard, Jr. | 260—901 |
| 3,557,050 | 1/1971 | Koizumi | 260—45.8 |

DONALD E. CZAJA, Primary Examiner

R. A. WHITE, Assistant Examiner

U.S. Cl. X.R.

260—45.7 P